Sept. 22, 1970     E. H. BUCH     3,529,790
MEANS FOR CHANGING WING INCIDENCE FOR
VARYING ANGLES OF ATTACK Filed Feb. 18, 1969     4 Sheets-Sheet 1

ERWIN H. BUCH
INVENTOR.

BY *Charles E M Woodward*

ATTORNEY

Sept. 22, 1970  E. H. BUCH  3,529,790
MEANS FOR CHANGING WING INCIDENCE FOR
VARYING ANGLES OF ATTACK Filed Feb. 18, 1969  4 Sheets-Sheet 2

ERWIN H. BUCH
  INVENTOR.

BY
Charles E. Woodward

ATTORNEY

Sept. 22, 1970  E. H. BUCH  3,529,790
MEANS FOR CHANGING WING INCIDENCE FOR
VARYING ANGLES OF ATTACK
Filed Feb. 18, 1969  4 Sheets-Sheet 3
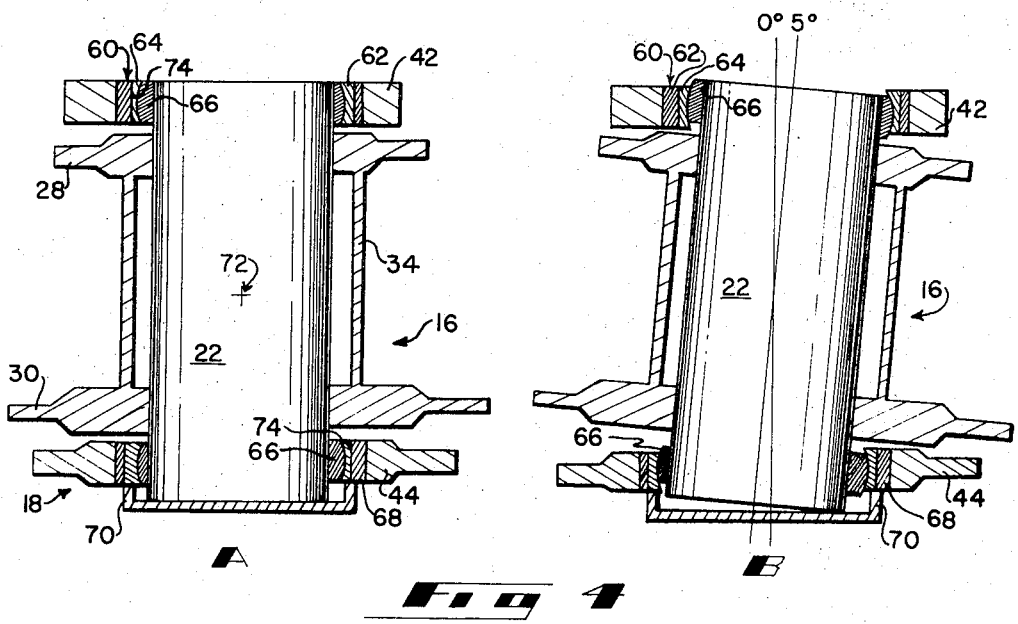
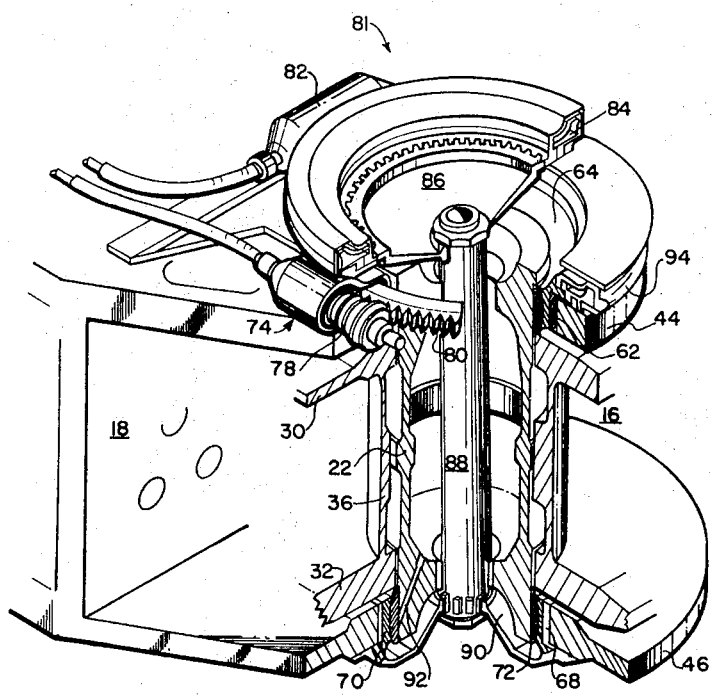
ERWIN H. BUCH
INVENTOR.
BY
ATTORNEY Sept. 22, 1970        E. H. BUCH        3,529,790
MEANS FOR CHANGING WING INCIDENCE FOR
VARYING ANGLES OF ATTACK Filed Feb. 18, 1969        4 Sheets-Sheet 4

ERWIN H. BUCH
INVENTOR.

BY Charles W. Woodward

ATTORNEY

United States Patent Office 3,529,790
Patented Sept. 22, 1970

3,529,790
MEANS FOR CHANGING WING INCIDENCE FOR VARYING ANGLES OF ATTACK
Erwin H. Buch, Fort Worth, Tex., assignor to General Dynamics Corporation, Fort Worth, Tex., a corporation of Delaware
Filed Feb. 18, 1969, Ser. No. 800,052
Int. Cl. B64c 3/48
U.S. Cl. 244—48          4 Claims

ABSTRACT OF THE DISCLOSURE

An aerodynamic surface pivot pin or attach point mounted to a fuselage structure, the aerodynamic surface supported by upper and lower lugs on each side of the support structure, each lug having a spherical bearing where the surface bending moment is reacted as a couple between upper and lower lugs, the spherical bearing race being eccentrically rotatable in the lug, the inclination of the pivot pin being variable by rotation of the eccentrics to alter angle of incidence and/or dihedral of the aerodynamic surface.

---

This invention relates generally to a means for varying the angle of attack of an aerodynamic surface.

More specifically, the invention relates to a means for selectively achieving variable wing incidence for pivotal wing aircraft in flight.

The advantages of selective mechanical variation of angle of incidence for pivotal aircraft wings include: (1) improved visibility over the nose during landings and take-offs; (2) decreased ground clearance angle requirements permitting improved fuselage aerodynamics; (3) a decrease in landing gear loads, permitting among others, weight improvement; (4) improved catapulting capability for carrier based aircraft; and (5) improved performance and mission economics during loiter, ferry, and "station-keeping" portions of flight profiles.

Although the "prior art" has tried to achieve these advantages, prior to the present invention the means to do so were either comprises in wing pivot fittings, or were exceptionally complex mechanical movements having very little structural continuity.

Examples of such prior art teachings are roughly divisible into two categories, first—those having a fixed, inclined pivot which causes the dihedral angle of the wings to change during sweep, exemplified by U.S. Pats. 2,794,608 to C. L. Johnson and 2,915,261 to B. N. Wallis; second—those having adjustable angles of incidence wherein a portion of the fuselage "pivots," such as British Pat. 894,365 to B. N. Wallis, British Pat. 741,717 wherein a motor-arm arrangement tilts the wing about a rod attachment, and British Pat. 741,719 to B. N. Wallis— which is the closest approach to the present invention— wherein eccentrically mounted torque tubes function both as pivot points for the wings for "sweep" and are tiltable from the vertical axis through reaction of sheaves in which the torque tubes are fixedly mounted. This action is accomplished by a rather complicated gearing mechanism capable of only low load and torque applications.

The present invention, for the first time, permits incorporation of variable angle of incidence capability in a sweep wing aircraft, utilizing a common pivot point which is selectively adjustable about its vertical axis to achieve incidence changes and accomplishes this result through utilization of a proven, standard wing sweep mechanism.

It is therefore an object of the invention to provide a variable wing angle of attack for variable sweep wing aircraft.

It is a further object of the invention to provide the capability for pivoted wing type aircraft to vary its wing angle of attack through means tilting the axis of the wing pivot pin and thus the wing chord plane at the aircraft wing support structure.

It is another object of the invention to provide a pivotal wing aircraft wherein the wing is supported by upper and lower lugs on each outboard side of the support structure, each lug having a spherical bearing where the wing bending movement is reacted as a couple between the lugs, and wherein the spherical bearing race is eccentrically rotatable in the upper and/or lower lugs to vary the inclination of the pivot pin.

Other and further objects and advantages of the present invention will be apparent to those skilled in the art on examination of the following specific description of preferred embodiments of the invention, when taken in conjunction with the drawings, wherein:

FIG. 4 is an elevational, sectional view of an idealized pivot of the present invention for orientation;

FIG. 5 is a perspective, partially sectional view of one embodiment of the invention.

Figure 1:
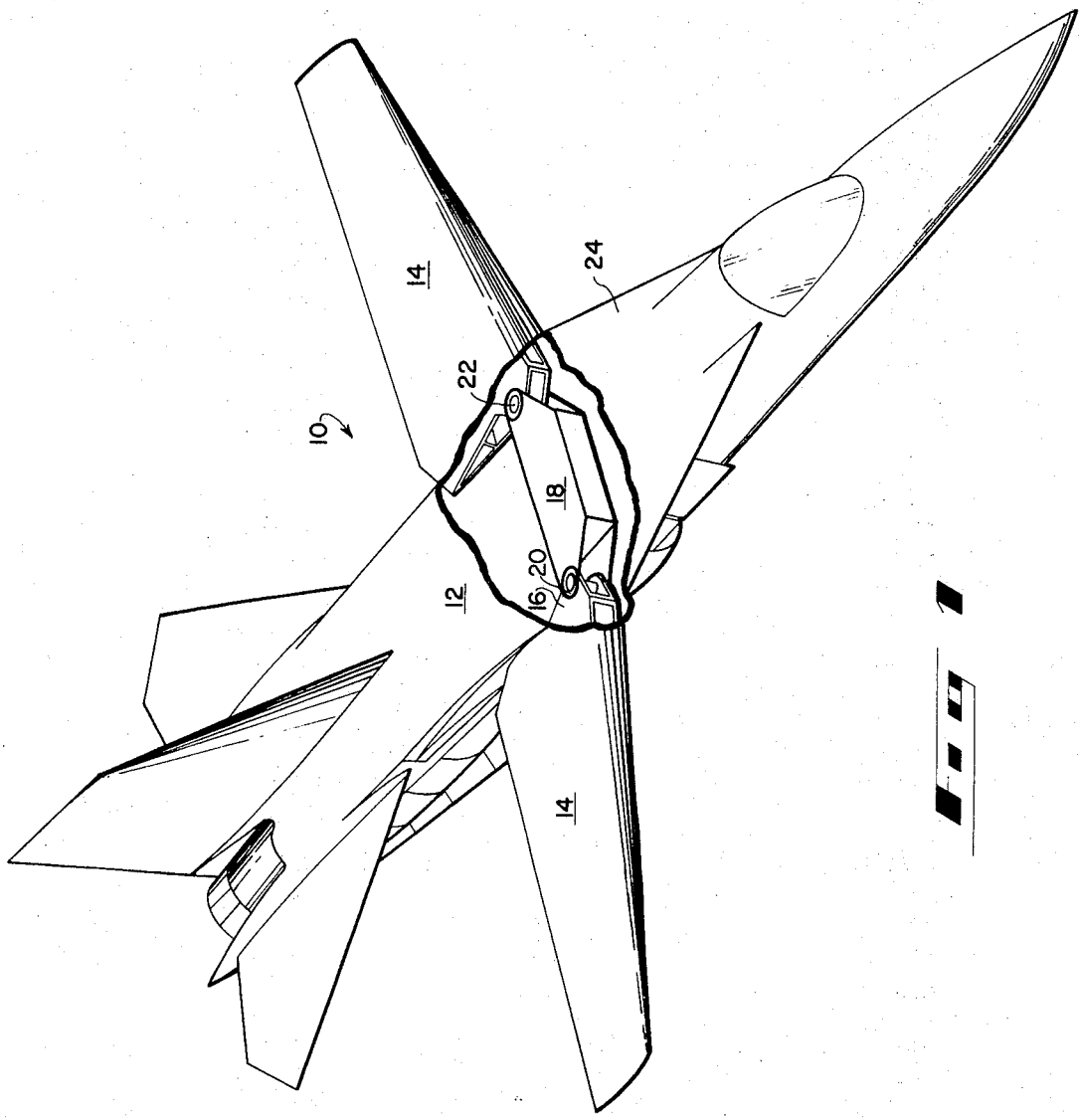
FIG. 1 is an isometric view of a sweep wing aircraft, with a portion of the skin removed, showing the basic structure of a typical sweep wing and its support structure for orientation.
Figure 2:
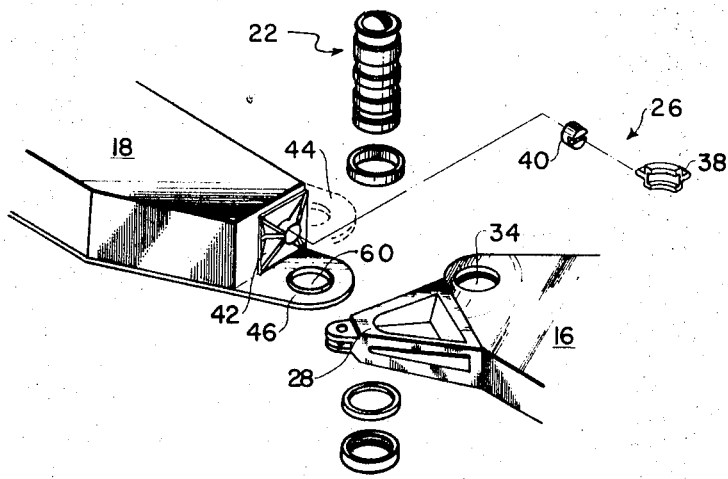
FIG. 2 is a breakaway view of the major components of the pivot of FIG. 2.
Figure 3:
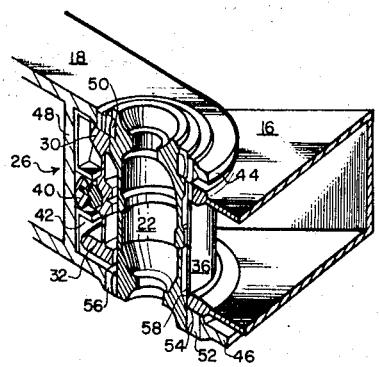
FIG. 3 is an isometric sectional view of one pivot structure showing the relationship of pivot components prior to modification according to the present invention.

The method of achievement of variable incidence capability in accordance with the present invention is most readily accomplished by utilization of the basic structural concepts already developed and exemplified in reference to FIGS. 1–3.

Having reference first to FIG. 1, there is shown a sweep wing aircraft 10, having fuselage 12 and pivotal wings 14, each of the wings 14 having a wing pivot fitting 16 mating with a wing pivot support assembly 18—carry through structure—into which the major wing loads are reacted at wing pivot joint 20. Each pivot joint 20 includes pivot pin 22. It is notable that for purposes of aerodynamic stability, pivot joints 20 are "outboard" of the fuselage outline and covered by glove 24.

The general relationship of components mating at pivot joint 20 is apparent from FIG. 2, wherein it is clearly seen that pivot joint 20, FIG. 1, comprises wing pivot fitting 16 which fits between lugs (only one of which is shown) of carry through structure 18, fitting 16 and 18 having means 26 for transfer of vertical shear loads between wing 14 and fuselage 12 through carry through structure 18. Pin 22 fits through the lugs of wing pivot fitting 16 and carry through structure 18. Each wing pivot fitting 16 is provided with sweep actuating means reaction arm 28.

FIG. 3 shows the pivot components in their operative relationship. As shown, wing pivot fitting 16 comprises compression wing lug 30 and tension lug 32, provided with pin aperture 34, FIG. 2, around which collar 36 is positioned. Collar 36 acts as a transfer member to transfer wing vertical shear into carry through structure 18 through transfer means 26. Means 26 preferably comprises a sliding lug 38 attached (as by bolts, not shown), to wing pivot fitting 16 midway between the wing upper lug 30 and lower lug 32 and mating in a slot in self-aligning ball 40, which is in turn retained in bracket 42 of carry through structure 18.

Carry through structure 18 is a box-type structure, the upper and lower surfaces of which form clevis lugs, the upper (compression) lug 44 and lower (tension) lug 46.

Vertical shear webs, such as 48 complete the box structure with internal reinforcements (not shown) to accommodate vertical shear reaction fittings, the sweep actuator acting on arm 28, etc.

The wing fitting 16 (and consequently the wing 14) rotates about an axis defined by self-aligning lubricated bearings 50, 52 in the upper and lower carry through structure lugs respectively. Thus, primary rotating surfaces are between the pivot pin 22 and the inner race of the self-aligning bearings 50, 52, as indicated, for example, at 54. A fail-safe secondary rotating surface exists between the inner and outer races of the self-aligning bearing, as at 56, and, redundantly, between the pivot pin 22 and the wing pivot fitting lugs 30, 32, as indicated at 58.

Wing bending loads follow a path from the wing pivot fitting 16 by bearing into the pivot pin 22, then by shear, bending and bearing to the self-aligning spherical bearings 50, 52 in lugs 44, 46 of carry through structure 18, and then into the fuselage 12.

The above "basic" structural concept has been utilized to its maximum extent in the present invention. In practicing the invention, basic load paths are unchanged when variable incidence capability is incorporated in accordance with the present invention. An additional bearing surface is added between the spherical bearing race, and the method of bearing retention is slightly altered as explained in detail hereinafter.

Although as noted above, the basic load paths through the above pivot joint are rather direct, many factors affect secondary loadings, including, among others, the extremely high bearing pressure encountered during operation during which the pin apertures 60 (FIG. 2) of carry through structure 18 elongate or "egg-shape" under flight loads, and the lugs 44, 46 twist in respect to each other. Coefficients of friction change with load, temperature, number of cycles, relative humidity, and manufacturing tolerances.

The basic load to be contended with is the wing bending moment $M_w$ at the pivot joint 20 (FIG. 1). The lug load $P_L$ may be determined by dividing the moment $M_w$ by the distance, $h$, between the lug centerlines, while the unit bearing load $F_b$ is determined by dividing the lug load $P_L$ by the effective bearing area which is the product of the pin diameter $D_o$ and the journal bushing depth $T_{br}$. Thus $$P_L = M_w/h$$
$$F_b = P_L/(D_o)(T_{br})$$

From the above, the indeterminate quality of the secondary loads can be readily appreciated, and is a prime reason for the basic pivot structure detailed above.

FIG. 4 shows an idealized sectional, elevational view taken along the line IV—IV of FIG. 1 showing the pivot of the present invention in its normal position A and following inclination to increase the angle of incidence. Basically, wing pivot fitting 16 and carry through structure 18 are mated through wing lugs 30, 32 and 44, 46 respectively by pivot pin 22, carry through structure 18 being fixed and wing pivot fitting 16 and pin 22 being movable about the X and Y-axis relative thereto. Movement from the Y-axis, or tilt, is accomplished through eccentric cams 62, 64 around the upper spherical, self-aligning bearing 66 and 68, 70 about the lower spherical self-aligning bearing 72. A drive system 74, represented schematically, drives the eccentric cams relative to one another. Eccentric cams 62, 64, 68 and 70 act as bearing retainers (much like bearings 48, 50 in FIG. 3), which, when counterrotated simultaneously, tilt pivot pin 22 and the wing pivot 16 through lugs 30, 32, within the clevis-like support of lugs 44, 46 of carry through structure 18. FIG. 4–B shows the structure and relationship after the cams have been rotated 180° for full variable incidence change. The tilt axis 72 is always at the station and water line of the shear take-out means (26 in FIG. 3), the spherical self-aligning ball 40, FIG. 3, rotating to align with the incidence tilt in the variable incidence configuration illustrated in FIG. 4. Spherical bearings 66, 72 at the carry through structure lugs 44, 46 rotate and "tilt" in the spherical races of the bushings 64, 70 with the wing and wing pivot fitting 16, the eccentrics 64, 70 rotating during wing sweep with their outer bearing surface against eccentric bushings 62, 68 thus adding a new and additional bearing surface 76 to the structure of FIG. 3.

FIG. 5 is an isometric view, partially in section, of one preferred embodiment of the structure of the present invention, wherein a double enveloping worm gear is employed for cam actuation. As in the prior structure, carry through fitting 18, having lugs 44, 46 bracket wing pivot fitting 16 having lugs 30, 32 spaced by wing vertical shear transfer collar 36 engaging shear transfer means 26 (not shown) on carry through structure 18. Carry through structure 18 and wing pivot fitting 16 are rotatably positioned relative to one another by pivot pin 22 carrying spherical bearings 50, 52, which ride in spherical races of eccentric inner cam bushings 64, 70, which rotatably engage outer cams 62, 68 as now clearly shown in the idealized structure of FIG. 4. Drive mechanism 74 for the upper inner eccentric includes a worm gear having worm screw 78 engaging the outer toothed portion of worm wheel 80, which in turn engages the toothed portion of upper inner cam 64 causing it to rotate against outer cam 62, thus displacing the axis of pin 22. A second drive mechanism 81 displacing the lower end of pin 22 includes a worm gear comprising a screw (not shown) in housing 82, the screw engaging worm wheel 84, a toothed inner portion of wheel 84 engaging a toothed outer portion of upper spider 86, slideably positioned on the upper end of torque tube 88 which extends through pivot pin 22. The lower end of torque tube 88 is slideably engaged with lower spider drive member 90 engaging lower inner cam member 70, the inner portion of which forms a race for the spherical bearing 72 and the outer portion of which bears an outer eccentric bushing 68. Obviously, pivot pin 22 may be provided with lubrication orifices 92. On actuation of drive systems 74, 81, the inner cam members 64, 70 rotate against outer eccentrics 62, 68, causing the axis of pivot pin 22 to "tilt" about its midpoint, thus increasing or decreasing the angle of incidence of the wing through tilting of wing pivot assembly 16. Obviously, the drive systems need not be stacked, but may be individual to the upper and lower eccentrics, thus eliminating the torque tube. Rotational movement during wing "sweep" remains the same as for the non-changeable pivot assembly of FIGS. 1–3. The gear case 94 is preferably mounted independently of the pivot support lugs 44, 46 and fabricated of a low modulus material to minimize residual load introduction from the carry through structure 18.

Figure 6:
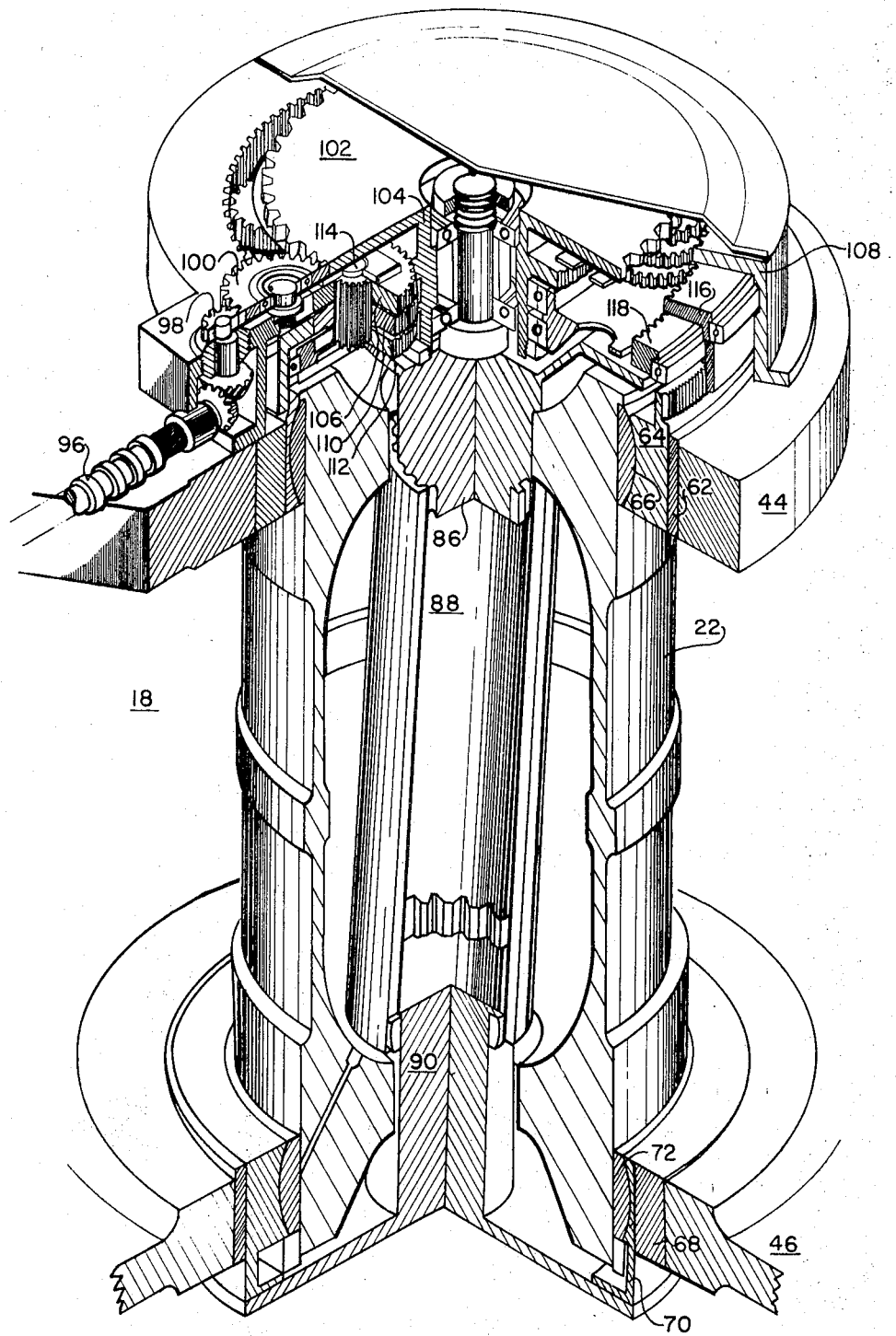
FIG. 6 is a perspective view, partially in section, of another preferred embodiment of the invention.

FIG. 6 is an isometric view partially in section of one preferred embodiment of the structure of the present invention, wherein a compound planetary gear drive unit is employed for cam actuation. As in the prior structure, carry through fitting 18 having lugs 44, 46, bracket wing pivot fitting 16 having lugs 30, 32 (not shown for purposes of clarity) spaced by wing vertical shear transfer collar 36 engaging shear transfer means (not shown) on carry through fitting 18. Carry through fitting 18 and wing pivot fitting 16 are rotatably positioned relative to one another by wing pivot pin 22 carrying spherical bearings 66, 72 which ride in spherical races of eccentric inner cam bushings 64, 70 which rotatably engage outer cams 62, 68. Drive mechanism 96 for the upper eccentric includes a bevel gear 98 which drives spur gear 100 which in turn drives drive gear 102 which carries sun gear 104 affixed thereto. This movement of sun gear 104 in turn drives a series of planetary gears 106. This movement of the planetary gear 106 drives against toothed cover 108 which is fixed in place by being fixedly attached to compression lug 44. This results in tracking or orbiting of the planetary gears 106 around the inner toothed circumference of outer gear case cover 108. Planet gears 110, 112 are joined to planetary gear 106 by means of splined shaft pinion pin 114 and rotate at same speed as planet gear 106. Planet gears 110, 112 have a different number of teeth than planetary gear 106 which causes gear 110 to drive toothed inner gear case cover 116 which in turn carries inner eccentric 64 which is splined thereto. By the same process planet gear 112 drives inner toothed faced ring 118 thus rotating spider 86 which is attached thereto. This rotation of spider 86 is conveyed to torque shaft 88 which is slideably engaged to the spider and extends through pivot pin 22. The lower end of torque tube 88 is slideably engaged with lower spider drive member 90 engaging lower inner eccentric 70, the inner portion of which forms a race for the spherical bearing 72 and the outer portion of which bears an outer eccentric bushings 68 causing the axis of pivot pin 22 to "tilt" about its midpoint, then increasing or decreasing the angle of incidence of the wing through tilting of wing pivot assembly 16. Rotational movement during wing sweep remains the same as for the non-changeable pivot assembly of FIGS. 1–3. As in the embodiment shown in FIG. 5 the gear case 108 is preferably mounted independently of the pivot support lugs 44, 46 and fabricated of a low modulus material to minimize residual load introduction from the carry through strutcure 18.

As above described, there has been provided, for the first time, a practical and rugged means for achieving variable angle of incidence capability for pivotal wing aircraft through incorporation of paired upper and lower cam bearing means which, when the pairs are rotated relative to one another will act to tilt the axis of the wing pivot pin and consequently directly change the wing angle of incidence.

Having thus described the invention, I claim:

1. Pivot means for a variable sweep wing aircraft comprising:
    (A) a fuselage having a wing pivot support assembly extending thereacross and structurally integral therewith operative to transmit wing loads to said fuselage,
        said wing pivot support assembly comprising a box-type structure having spaced upper and lower surfaces joined by shear webs to accommodate vertical shear reaction, and self-aligning vertical shear transfer means operatively associated with wing structure, said surfaces extending outboard of the fuselage outline to form clevis-like upper and lower lugs on each side thereof, said lugs having substantially vertically aligned apertures for the reception of a single, large diameter pivot pin;
    (B) wing structure operatively associated with said wing pivot support assembly, said structure comprising in part a box-type wing pivot fitting having upper and lower lugs spaced apart a distance less than said wing pivot support assembly lugs each having substantially vertically aligned apertures therein for reception of a pivot pin, an outwardly extended portion of said wing pivot fitting forming a sweep reaction arm for operable association with a selectively actuatable sweep mechanism to cause said wing structure to pivot about a pivot pin connecting said wing pivot support assembly and said wing pivot fitting, and wing vertical shear transfer means operably associated with said wing pivot support assembly self-aligning vertical shear transfer means;
    (C) a large diameter pivot pin extending for rotational movement through the upper and lower lugs of both said wing pivot support assembly and said wing pivot fitting;
        (1) said pivot pin having self-aligning bearing means positioned therearound adjacent the extremities thereof operably associated with said upper and lower wing pivot support assembly lugs, said self-aligning bearing means, comprising in combination
            (a) a first bearing means adjacent said pivot pin having an outer spherical surface, the surfaces defined by said pivot pin and the inner side of said first bearing means forming the primary rotating surfaces;
            (b) second bearing means in slideable contact and conforming with the spherical surface of said first bearing means and rotatable thereon, the surface between said second bearing means and said first bearing means constituting a failsafe secondary rotating bearing surface, said second bearing means being an eccentric bearing one surface of which constitutes a camming surface operable on rotation of the eccentric to tilt the axis of said pivot pin;
            (c) means selectively operable to impart independent rotation to said second bearing means;
        (2) said pivot pin having secondary bearing surfaces mating with the surfaces of the apertures of said upper and lower wing pivot fitting lugs to thereby constitute redundant secondary rotating bearing surfaces.

2. The pivot means as defined in claim 1 wherein:
    (A) said second bearing means comprises inner and outer bearing members rotatable with respect to each other, each said member being eccentric in shape, the contacting surfaces of which constitute camming surfaces on rotation of said inner member in respect to said outer member;
    (B) means connecting said upper and lower second bearing means through the interior of said pivot pin responsive to said selectively operable means to cause out of phase rotation of said upper and lower bearing members.

3. The pivot means defined by claim 1 wherein:
    (A) said second bearing means comprises inner and outer bearing members, said inner bearing member being rotatable with respect to said outer bearing member in response to said selectively operable rotation imparting means;
    (B) said selectively operable rotation imparting means comprises
        (1) first and second gear means operably connected to said upper and lower second bearing means respectively;
            (a) said first gear means comprising a worm screw meshing with a worm wheel, said wheel operative to cause rotation of said upper inner bearing member causing said bearing member to rotate relative to said outer bearing member and said first bearing means;
            (b) said second gear means comprising a worm screw meshing with a second worm wheel, said second worm wheel rotationally extending one extremity of a torque shaft engaging through said pivot pin, the opposite extremity of said shaft pivotally engaged by means driving said lower inner bearing member operable to cause said member to rotate relative to said lower outer bearing member and said lower first bearing means.

4. The pivot means defined by claim 1 wherein:
    (A) said second bearing means comprises inner and outer bearing members, said inner bearing member being rotatable with respect to said outer bearing member in response to said selectively operable rotation imparting means;
    (B) said selectively operable rotation imparting means comprises (1) means operative to impart rotation to a drive gear;
(2) a drive gear, said gear carrying thereon a sun gear having a diameter less than said drive gear;
(3) plural stacked sets of planetary gears, at least one gear in each set operative to mesh with a toothed cover member, said cover member fixedly attached to said upper lug so that said planetary gears orbit said sun gear and track around the inner circumference of a toothed outer gear case cover;
    (a) the other gears in each set engaging and driving an inner gear case cover and inner toothed spider ring respectively;
(4) said inner gear case cover causing rotation of inner bearing member;
(5) said inner toothed spider ring rotating a torque shaft extended through said pivot pin, said torque shaft engaging a lower bearing drive means;
(6) said lower bearing drive means rotating said second inner bearing means located at the lower lug of said wing-pivot support assembly;
    the inner bearing member of said second bearing means having their eccentric off-set one from another so that differential rotation thereof causes said pivot pin to tilt about its centerpoint, carrying said wing pivot fitting lugs therewith and thus varying the wing angle-of-incidence.

References Cited

UNITED STATES PATENTS

| | | | |
|---|---|---|---|
| 1,535,568 | 4/1925 | Bornschein | 308—62 |
| 2,734,701 | 2/1956 | Horton | 244—48 |
| 3,069,924 | 12/1962 | Watanabe et al. | 74—424.8 |
| 3,279,721 | 10/1966 | Dethman | 244—46 |
| 3,451,646 | 6/1969 | Aarnaes | 244—46 |

FOREIGN PATENTS 741,719   12/1955   Great Britain.

TRYGVE M. BLIX, Primary Examiner

C. A. RUTLEDGE, Assistant Examiner

U.S. Cl. X.R.

308—62